United States Patent
Kaliszek et al.

(10) Patent No.: US 7,295,323 B2
(45) Date of Patent: Nov. 13, 2007

(54) ADHESIVE SYSTEM AND METHOD FOR FORMING A FIBER OPTIC GYROSCOPE SENSING COIL

(75) Inventors: Andrew W. Kaliszek, Phoenix, AZ (US); Edward Summers, Glendale, AZ (US); Wesley H. Williams, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 257 days.

(21) Appl. No.: 11/096,322

(22) Filed: Mar. 31, 2005

(65) Prior Publication Data

US 2006/0221347 A1    Oct. 5, 2006

(51) Int. Cl.
*G01C 19/64* (2006.01)
(52) U.S. Cl. .................................................... 356/465
(58) Field of Classification Search ........... 250/227.14; 156/275.37, 291, 295; 356/460, 450, 465; 385/134, 135, 137
See application file for complete search history.

(56) References Cited

U.S. PATENT DOCUMENTS

| | | | |
|---|---|---|---|
| 5,546,482 A * | 8/1996 | Cordova et al. .............. 385/12 |
| 5,624,521 A * | 4/1997 | Hed ......................... 156/275.7 |
| 5,667,884 A * | 9/1997 | Bolger ........................ 428/323 |
| 5,814,031 A * | 9/1998 | Mooney et al. ............. 604/307 |
| 5,841,932 A * | 11/1998 | Page et al. .................... 385/134 |
| 6,320,664 B1 * | 11/2001 | Kaliszek et al. ............ 356/464 |
| 6,349,166 B1 * | 2/2002 | Kaliszek et al. ............ 385/137 |
| 6,496,373 B1 * | 12/2002 | Chung ........................ 361/705 |
| 6,522,826 B2 * | 2/2003 | Gregory ..................... 385/135 |
| 6,650,821 B1 * | 11/2003 | Koyano et al. ............. 385/136 |
| 6,744,132 B2 * | 6/2004 | Alcoe et al. ................. 257/706 |
| 6,980,709 B2 * | 12/2005 | Carlson et al. ............... 385/12 |
| 2002/0179760 A1 * | 12/2002 | Gregory ..................... 242/118.4 |
| 2004/0041085 A1 * | 3/2004 | McLean et al. ......... 250/227.14 |
| 2005/0176867 A1 * | 8/2005 | He et al. ..................... 524/487 |

OTHER PUBLICATIONS

PCT International Search Report PCT/US2006/009199, Aug. 8, 2006.

* cited by examiner

*Primary Examiner*—Samuel A. Turner

(57) ABSTRACT

Adhesive system and method are provided for affixing a fiber optic coil to a hub with an adhesive in a fiber optic gyroscope. The adhesive system comprises a fiber optic coil, a substantially cylindrical hub configured to couple with the fiber optic coil, and an array of adhesive dots affixing the fiber optic coil to the substantially cylindrical hub. The method comprises forming an array of adhesive dots on an outer surface of the hub, and affixing the fiber optic coil to the outer surface of the hub via the array of adhesive dots.

18 Claims, 3 Drawing Sheets

ADHESIVE SYSTEM AND METHOD FOR FORMING A FIBER OPTIC GYROSCOPE SENSING COIL

FIELD OF THE INVENTION

The present invention generally relates to fiber optic gyroscope systems, and more particularly relates to an attachment of a sensing coil in a fiber optic gyroscope system and method for forming the sensing coil.

BACKGROUND OF THE INVENTION

Gyroscopes have been used to measure rotation rates or changes in angular velocity about an axis. A basic conventional fiber optic gyroscope (FOG) includes a light source, a beam generating device (e.g., a beam-splitter), and a coil of optical fiber coupled to the beam generating device that encircles an area. The beam generating device transmits light beams originating from the light source into the coil of optical fiber, and these light beams propagate in a clockwise (CW) direction and a counter-clockwise (CCW) direction along the core of the optical fiber. The two counter-propagating (e.g., CW and CCW) beams experience different pathlengths while propagating around a rotating path, and the difference between the two pathlengths produces a phase difference between the two counter-propagating beams that is proportional to the rotational rate.

Many FOGs utilize a glass-based optical fiber to conduct light along a solid core of the fiber over long distances with low loss and distortion. This optical fiber has a glass/silica core surrounded by a plastic jacket, or buffer, and may be wound into a cylindrical structure, such as a coil, and affixed to a coil-supporting structure, such as a cylindrical hub, to form a sensing coil. The hub and fiber optic coil are both substantially cylindrical structures oriented about a center axis, and the hub has a relatively smaller radius than the radius of the fiber optic coil. An adhesive coating between the outer surface of the hub and inner surface of the fiber optic coil may be used affix the fiber optic coil to the hub.

Because the optical fiber is a composite structure, the glass/silica core and the plastic buffer may each respond differently to a variety of environmental factors and thereby adversely affect the pathlength difference between the two counter-propagating waves. Some of these environmental factors include temperature and mechanical strain that may create a bias between the phases of the two counter-propagating waves such that the output of the sensing coil yields a phase difference between the two counter-propagating waves that is indistinguishable from a rotation-induced phase difference. During operation, a FOG may be placed in an environment having a fluctuating ambient temperature. Temperature variations affect the sensing coil in two ways: first, the sensing coil undergoes mechanical strain as a result of a differential thermal expansion; and second, the optical transmission properties of the optical fiber change with the temperature. A Coefficient of Thermal Expansion (CTE) mismatch between the glass/silica core and the plastic buffer may result in a transverse expansion of the fiber optic coil that is significantly larger than the lengthwise expansion of the fiber optic coil. Because of the non-isotropic structure of the fiber optic coil, the radial expansion of the fiber optic coil, constrained by the glass/silica core of the optical fiber, is significantly smaller than the axial expansion of the fiber optic coil that is dominated by the large CTE of the plastic buffer. Further, the outer diameter of the fiber optic coil generally expands radially away from the center axis of the fiber optic coil while the inner diameter of the fiber optic coil generally expands radially toward the center axis of the fiber optic coil.

In addition to the expansion of the fiber optic coil, the hub may also expand in response to temperature fluctuations. For example, a hub made from an isotropic material may expand relatively uniformly in both the axial direction and in the radial direction with respect to the center axis. As a result, when a FOG is exposed to a temperature change such that the fiber optic coil and hub both expand, the hub radially expands faster than the fiber optic coil expands, as a whole, and imparts stress on the fiber optic coil. Additionally, the radial expansion of the hub against the opposite expansion direction of the inner diameter of the fiber optic coil may produce significant mechanical interference between theses components resulting in an outward radial pressure exerted at the fiber optic coil interface that induces stresses in the coil structure.

Employing a compliant adhesive, that distorts to accommodate the outward radial expansion of the hub as well as the inward radial expansion of the inner diameter of the fiber optic coil, may minimize such stresses on the fiber optic coil. When the adhesive is softer than the hub material, the stress induced in the fiber optic coil is generally less than the stress induced by the expanding hub alone. The hydrostatic pressure associated with the axial compression of the adhesive material is relieved through its expansion in lateral directions to the extent allowed by hyper-elastic properties of the adhesive material and by the available free area around the adhesive.

Despite employing a compliant adhesive, a continuous adhesive coating bonding the hub to the fiber optic coil may impose undesirable strains on the fiber optic coil over temperature variations because the adhesive behaves as a constrained fluid that applies hydrostatic pressure on the fiber optic coil. In general, compressive stresses on an adhesive coating tend to push the volume of the adhesive outward along a free, or unconstrained, surface area of the adhesive coating, e.g., the sides or edges of the adhesive coating. Because the adhesive coating has a small free surface area, in comparison with the constrained or bonding surface area, the adhesive coating is relatively incompressible. In this example, attempting to decrease the volume of the adhesive generally reduces the compliance of the adhesive. In other words, the adhesive typically stiffens to counter the attempted volume reduction.

Accordingly, it is desirable to provide a sensing coil for a fiber optic gyroscope that minimizes the coil stress from environmental factors. More particularly, it is desirable to provide an adhesive system for affixing a fiber optic coil to a hub in a fiber optic gyroscope that minimizes the coil stress from thermal expansion. In addition, it is desirable to provide a method for supporting a fiber optic coil in a sensing coil of a fiber optic gyroscope that minimizes the coil stress from environmental factors. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus and methods are provided for coupling a fiber optic coil to a hub in a fiber optic gyroscope system. In an exemplary embodiment, a sensing loop is provided for a fiber optic gyroscope. The sensing loop comprises a fiber optic coil, a substantially cylindrical hub configured to couple with the fiber optic coil, and an array of adhesive dots affixing the fiber optic coil to the substantially cylindrical hub.

In another exemplary embodiment, a method is provided for coupling a fiber optic coil to a hub of a fiber optic gyroscope (FOG). The method comprises the steps of forming an array of adhesive dots on an outer surface of the hub, and affixing the fiber optic coil to the outer surface of the hub via the array of adhesive dots.

In yet another exemplary embodiment, an apparatus is provided for supporting a fiber optic coil with an adhesive in a fiber optic gyroscope system. The apparatus comprises a substantially cylindrical wall having a first surface configured to couple with the fiber optic coil, a two-dimensional array of pores formed in the first surface of the substantially cylindrical wall, and a conduit extending axially through the substantially cylindrical wall and in fluid communication with one or more pores of the two-dimensional array of pores.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A system and method are provided for affixing a fiber optic coil to a hub to form a sensing coil for a fiber optic gyroscope (FOG). In one exemplary embodiment, a hub is provided for supporting the fiber optic coil with an adhesive. The hub comprises a substantially cylindrical wall having a first surface configured to couple with the fiber optic coil, a two-dimensional array of pores formed on the outer surface of the substantially cylindrical wall, and a conduit coupled to the two-dimensional array of pores. The conduit is configured to transfer the adhesive to the two-dimensional array of pores. In this exemplary embodiment, a two-dimension array of adhesive points may be extruded from the two-dimensional array of pores to affix the fiber optic coil thereto while allowing for thermal expansion of both the fiber optic coil and the hub.

Figure 1:
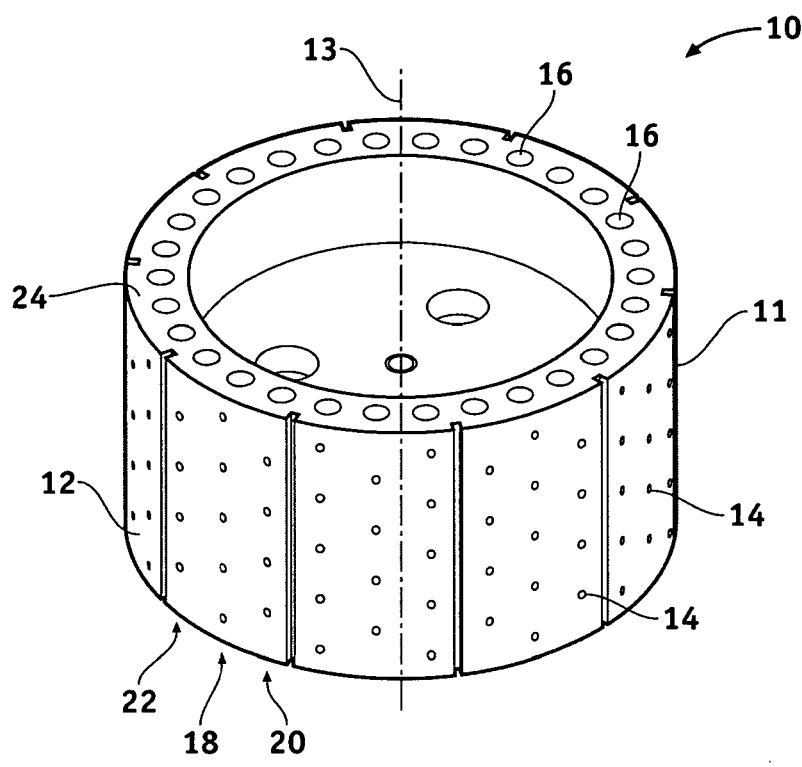
FIG. 1 is a perspective view of a hub for a fiber optic gyroscope in accordance with an exemplary embodiment of the present invention.
Figure 2:
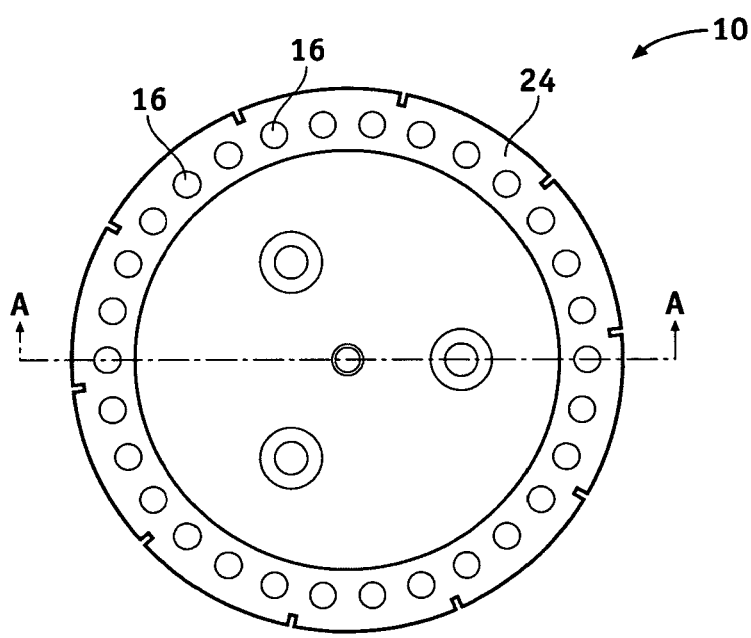
FIG. 2 is a top view of the hub shown in FIG. 1.

Referring now to the drawings, FIG. 1 is a perspective view of a hub 10 for a FOG in accordance with an exemplary embodiment of the present invention. FIG. 2 is a top view of the hub 10 shown in FIG. 1. The hub 10 includes, but is not necessarily limited to, a substantially cylindrical wall 12 having an outer surface 11, an array of pores 14 formed in the outer surface 11, and a plurality of conduits 16 that extends axially through the wall 12 and is in fluid communication with selected pores in the array of pores 14. The outer surface of the substantially cylindrical wall 12 supports a fiber optic coil (not shown), via an adhesive that is extruded through the array of pores 14, to form a sensing coil for use in an optical/electrical circuit of a FOG. When combined to form the sensing coil, both the fiber optic coil and the hub 10 are oriented about an axis 13 of the cylindrical wall 12.

The hub 10 may be made from a variety of materials. Exemplary hub materials include, but are not limited to: metal alloys, such as titanium; sintered metal composites made using powder metallurgy, such as copper tungsten or copper molybdenum; composite materials, such as filament wound fiber glass/epoxy, fiber glass/epoxy or aramid/epoxy; metal matrix composites, such as metal reinforced with ceramics such as boron, silicon, carbide, and graphite; ceramics; and, a composite made from any of the aforementioned materials. Although each of these materials may exhibit different thermal expansion, the selection of the hub material is not critical to minimizing coil stress from environmental factors, such as temperature and mechanical stress. The selection of hub material may be based in part on a particular application of the FOG and may influence the choice of both the adhesive and hub 10 to optimize the particular application.

The array of pores 14 is preferably a two-dimensional array (e.g., having more than one row of pores) uniformly distributed over the outer surface 11 of the substantially cylindrical wall 12 of the hub 10. For example, the spacing between one pore in the array of pores 14 from adjacent pores is preferably geometrically uniform for each of the pores. Each of the pores is preferably radially formed into the outer surface 11 of the substantially cylindrical wall 12. The size of the array of pores 14 may vary based on the area of the outer surface of the substantially cylindrical wall 12, and those of skill in the art will appreciate that the outer surface of the substantially cylindrical wall 12 may have a variety of longitudinal lengths (e.g., parallel to the axis of the cylindrical wall) to match the length of the fiber optic coil. In another exemplary embodiment, the array of pores 14 is organized into a plurality of rows of pores 18, 20, 22 such that the pores in one row of pores 18 is staggered from the pores in adjacent rows of pores 20, 22.

Figure 3:
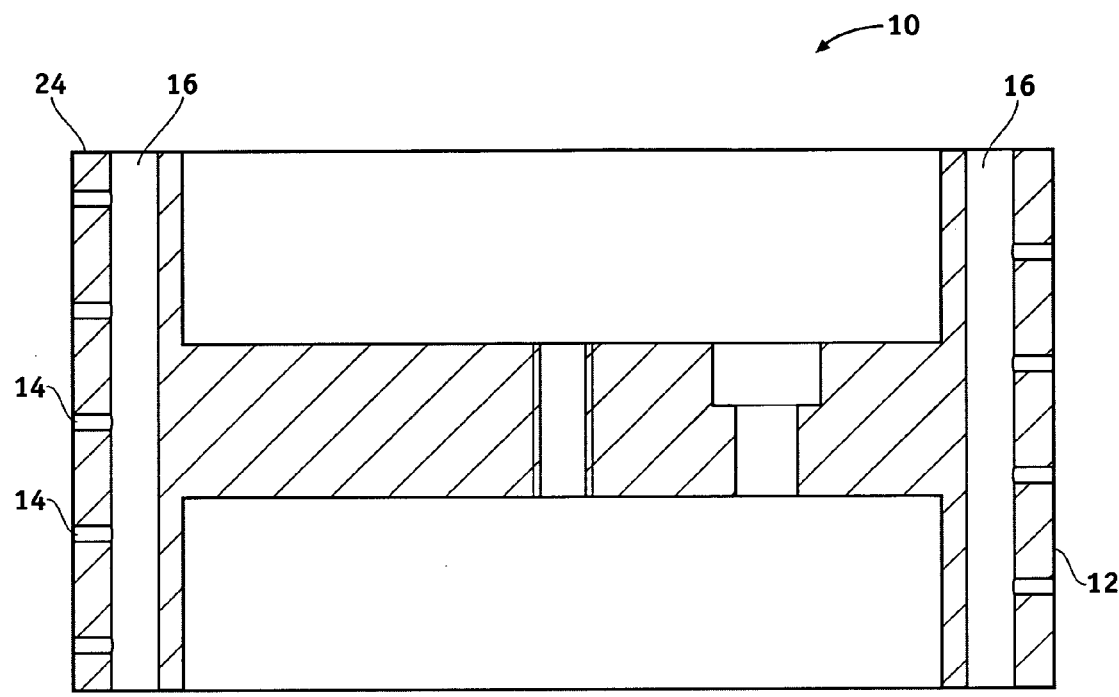
FIG. 3 is a cross-sectional view of the hub shown in FIG. 2 along A-A.

FIG. 3 is a cross-sectional view of the hub 10 shown in FIG. 2 along A-A. As previously mentioned, a two-dimensional array of adhesive points or dots may be extruded from the array of pores to affix a fiber optic coil thereto. The plurality of conduits 16 is configured to route an adhesive to the pores of the array of pores 14. In an exemplary embodiment, each of the conduits 16 provides access to the pores along a row of pores 18, 20, 22 of the array of pores 14, as best shown in FIG. 3. For example, a first conduit provides access to a first row of pores 18, a second conduit provides access to a second row of pores 20, a third conduit provides access to a third row of pores 22, etc. Each conduit has a pair of openings located at opposite ends 24 of the substantially cylindrical wall 12. In this embodiment, an injection tool may be inserted in each of the conduits 16, such as via on of the openings, and aligned with each pore to deliver the adhesive. Although the hub 10 is described as supporting the fiber optic coil using the array of pores 14 formed on the substantially cylindrical wall 12, the hub 10 may support the fiber optic coil at other areas of the hub 10.

Figures 4, 5:
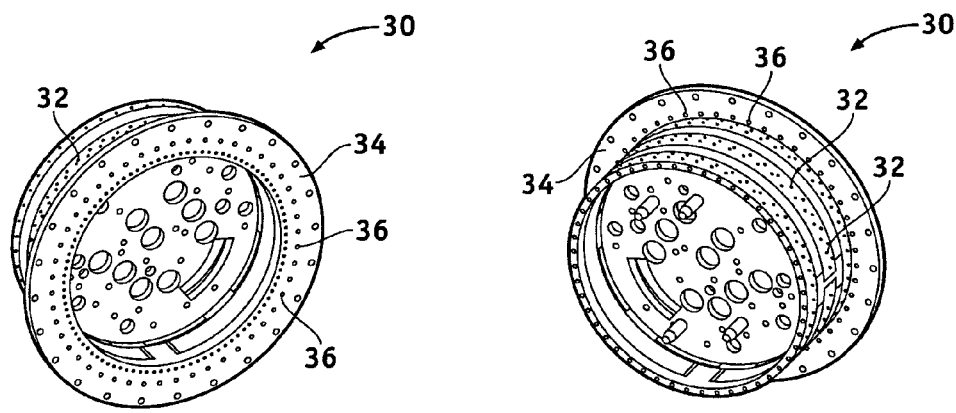
FIG. 4 is a bottom perspective view of a hub for a fiber optic gyroscope in accordance with another exemplary embodiment of the present invention.
FIG. 5 is a top perspective view of the hub shown in FIG. 4.

FIG. 4 is a bottom perspective view of a hub 30 for a FOG in accordance with another exemplary embodiment of the present invention. FIG. 5 is a top perspective view of the hub 30 shown in FIG. 4. In this exemplary embodiment, the hub 30 includes, but is not necessarily limited to, a substantially cylindrical wall 12, a flange 34 coupled or formed at one end of the substantially cylindrical wall 12, an array of pores 32 formed in the outer surface of the substantially cylindrical wall 12, and a plurality of pores 36 formed in the flange 34. The hub 30 supports a fiber optic coil at the outer surface of the substantially cylindrical wall 12 and at the flange 34 via an adhesive extruded through the array of pores 32 and the plurality of pores 36. The plurality of pores 36 are preferably substantially equidistant from the axis of the substantially cylindrical wall 12 to form a ring of pores 36 on the flange 34 that encircles the one end of the substantially cylindrical wall 12. By forming a first adhesive array at the array of pores 32 and a second adhesive array at the ring of pores 36, such as by extruding, one end of the fiber optic coil may be affixed to the hub 30 in addition to affixing the inner surface of the fiber optic coil to the outer surface of the substantially cylindrical wall 12.

Figure 6:
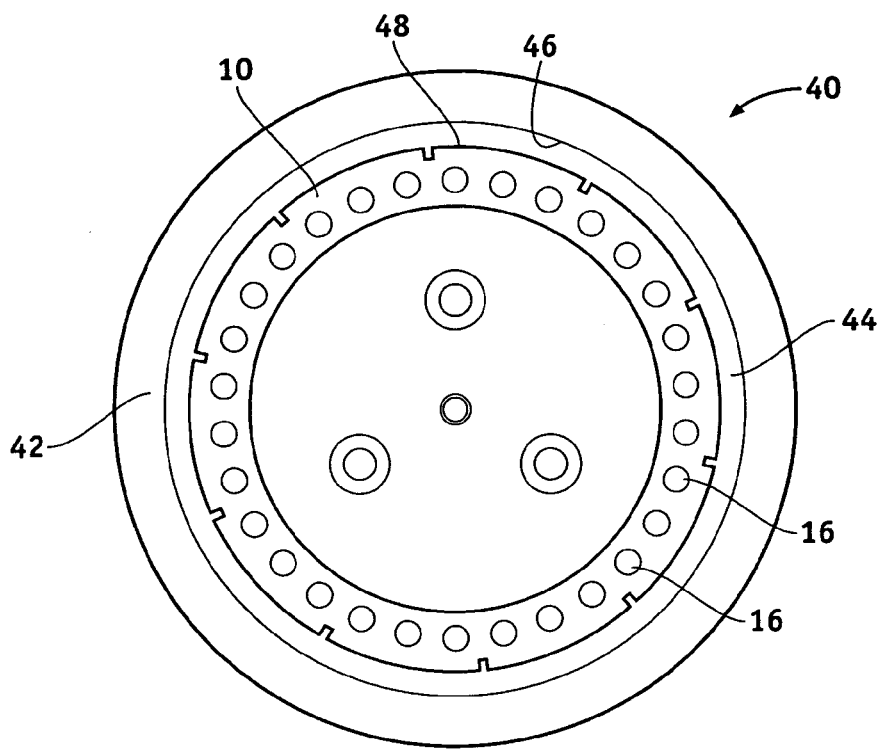
FIG. 6 is a top view of a sensing coil in accordance with an exemplary embodiment of the present invention.

FIG. 6 is a top view of a sensing coil 40 combining the hub 10 shown in FIGS. 1-3 with a fiber optic coil 42 in accordance with an exemplary embodiment of the present invention. The sensing coil 40 includes, but is not necessarily limited to, the hub 10 shown in FIGS. 1-3 having an outer surface 48, the fiber optic coil 42 having an inner surface 46, and an adhesive system 44 coupling the inner surface 46 of the fiber optic coil 42 with the outer surface 48 of the hub 10. In this exemplary embodiment, the adhesive system 44 comprises an array of adhesive dots produced by extruding an adhesive from the array of pores 14 as shown in FIG. 1. Using the array of adhesive dots significantly reduces reaction loads applied to the fiber optic coil 42 during expansion and contraction, such as from temperature fluctuations, and thereby minimizes distortion of the fiber optic coil 42.

The fiber optic coil 42 is typically composed of an optical fiber made from a glass medium. The optical fiber has an inner glass core and an outer glass shell, and the inner glass core and the outer glass shell have different optical indices of refraction. A plastic coating, or jacket, covers the outer glass to protect the surface of the outer glass from defects. In general, the optical fiber is specifically wound onto a bobbin, adhered, and cured to form the fiber optic coil 42 although other methods may be used to produce the fiber optic coil 42 from the optical fiber. The fiber optic coil 42 is substantially cylindrical and has a relatively thick cylindrical wall of optical fiber. In the coil structure, the fiber optic coil 42 may expand and contract during thermal fluctuations.

The adhesive may be selected to minimize the difference between the CTEs of the hub 10 and the fiber optic coil 42, e.g., to provide a uniform temperature environment for the fiber optic coil 42, and to minimize the vibration induced to the fiber optic coil 42. The adhesive 14 is suitably made from silicone rubber or Room Temperature Vulcanizing rubber (RTV rubber) and exhibits stable properties, such as stiffness and thermal conductivity over the environmental temperatures to which the FOG may be exposed.

The adhesive may be filled with one or more additional materials to enhance the FOG performance by minimizing vibration-induced effects. Exemplary filler materials include glass particles, quartz, graphite powder, carbon black, or aluminum oxide powder. Additionally, modified adhesives, i.e., a combination of adhesive and filler material, e.g., RTV rubber with carbon black filler, may be used. A filled adhesive generally maintains flexibility during thermal loading and typically exhibits increased stiffness under dynamic loads or vibrations. In other words, filled adhesives may increase the stiffness of the adhesion between a coil and a hub without compromising the thermal performance of the gyroscope.

A suitable soft adhesive may be RTV rubber or silicone rubber that has a Young's modulus approximately equal to or less than about 1000 psi. A suitable harder adhesive may incorporate filler material such that the resulting composition has a Young's modulus approximately equal to or less than about 2000 psi. The selection of adhesives properties, e.g., Young's modulus and adhesive thickness, depend on the particular application and environment in which the FOG may be used.

Figure 7:
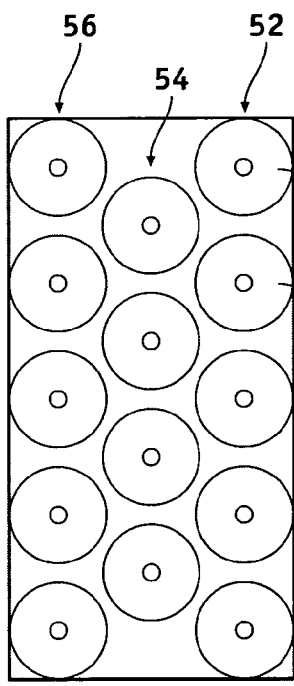
FIG. 7 is a partial front view of an adhesive system in accordance with an exemplary embodiment of the present invention.

FIG. 7 is a partial front view of the adhesive system 44 shown in FIG. 6. The adhesive system 44 comprises an array of adhesive dots 50, and each adhesive dot 50 in the array of adhesive dots 50 is preferably uniformly spaced apart from adjacent adhesive dots 50. As previously mentioned, the array of adhesive dots 50 is formed by extruding an adhesive out of each of the pores of the array of pores 14 as shown in FIGS. 1-3 to thereby center an adhesive dot 50 at each of the pores 14. In an exemplary embodiment, the array of adhesive dots 50 is organized into a plurality of rows of adhesive dots 52, 54, 56 such that the adhesive dots 50 of one row of adhesive dots 54 are staggered with respect to adjacent rows of adhesive dots 52, 56.

TABLE 1

| Pattern | S | K | $E_a$ (psi) | $E_e$ (psi) | σ (psi) |
|---|---|---|---|---|---|
| Solid fill | 40.09 | .63 | 355 | 719,319 | 7,597 |
| Radial | 5.72 | .63 | 355 | 14,965 | 158 |
| Array (.25 inch dot) | 2.28 | .63 | 355 | 2,685 | 28 |
| Array (.20 inch dot) | 2.04 | .63 | 355 | 2,219 | 23 |
| Array (.15 inch dot | 1.77 | .63 | 355 | 1,753 | 19 |

Table 1 shows the effects of an array of adhesive dots used to affix a two (2) inch diameter by 0.9 inch long fiber optic coil to the hub where $E_e$ is the effective Young's modulus, $E_a$ is the adhesive modulus, k is a constant that decreases with the hardness of the adhesive, S is the ratio of the bond area to the free surface area of the pattern, and σ is the stress in the fiber optic coil. The effective Young's modulus is determined as follows:

$$E_e = E_a(1 + 2kS^2).$$

The array of adhesive dots significantly increases the overall free surface area (i.e., non-bonding surface area) of the adhesive system to thereby more easily accommodate expansion and contraction of the fiber optic coil. The distortion stresses are shown by Table 1 to decrease by over two orders of magnitude using the array of adhesive dots in comparison with a solid filled adhesive coating between the fiber optic coil and the hub and a radial pattern of adhesive coating between the fiber optic coil and the hub. The solid filled adhesive pattern has a bond surface cross sectional area of about 4.431 in.$^2$ and a free surface area of about 0.111 in.$^2$, and the radial pattern has a bond surface cross sectional area of about 0.185 in.$^2$ and a free surface area of about 0.032 in.$^2$. In an exemplary embodiment, the array of adhesive dots has a compliance of less than about 100 psi, and preferably has a compliance of less than about 30 psi. In another exemplary embodiment, the array of adhesive dots has a bond surface cross sectional area from about 0.01 sq. in. to about 0.05 sq. in. and a free surface area from about 0.005 sq. in. to about 0.01 sq. in.

Figure 8:
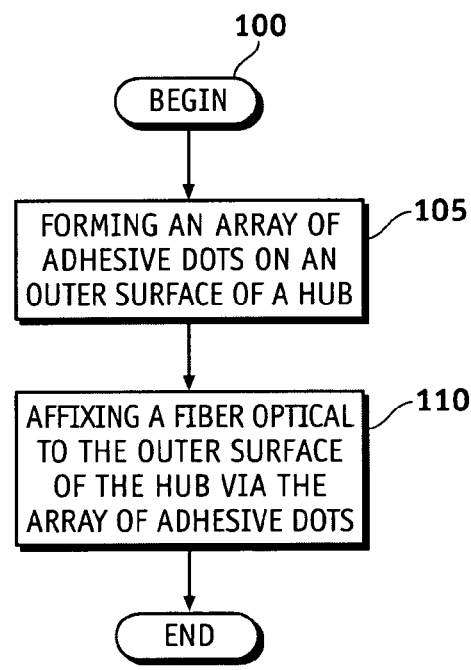
FIG. 8 is a flowchart of forming a sensing coil for a fiber optic gyroscope in accordance with an exemplary embodiment of the present invention.

FIG. 8 is a flowchart of forming a sensing coil for a FOG in accordance with an exemplary embodiment of the present invention. The method begins at step 100. An array of adhesive dots 50 (FIG. 7) is formed, such as by extruding an adhesive through the array of pores 14 (FIGS. 1-3), on the outer surface of the substantially cylindrical wall 12 of the hub 10 (FIGS. 1-3) at step 105. In an exemplary embodiment, the array of adhesive dots 50 (FIG. 7) is uniformly distributed along the outer surface of the substantially cylindrical wall 12 (FIGS. 1-3). In another exemplary embodiment, the adhesive dots of a first row of adhesive dots 54 (FIG. 7) of the array of adhesive dots 50 (FIG. 7) is staggered with respect to the adhesive dots of an adjacent row of adhesive dots of the array of adhesive dots 52, 56 (FIG. 7).

The fiber optic coil 42 (FIG. 6) is affixed to the outer surface of the substantially cylindrical wall 12 of the hub 10 (FIGS. 1-3) via the array of adhesive dots 50 (FIG. 7) at step 110. In exemplary embodiment, the fiber optic coil 42 (FIG. 6) is radially affixed to the outer surface of the substantially cylindrical wall 12 of the hub 10 (FIGS. 1-3) via the array of adhesive dots 50 (FIG. 7). In another exemplary embodiment, the fiber optic coil 42 (FIG. 6) is axially affixed to the flange 34 (FIG. 4) of the substantially cylindrical wall 31 (FIG. 4) of the hub 30 (FIG. 4) via the array of adhesive dots 50 (FIG. 7). In yet another exemplary embodiment, the fiber optic coil 42 (FIG. 6) is affixed to both the outer surface of the substantially cylindrical wall 12 of the hub 10 (FIGS. 1-3) via the array of adhesive dots 50 (FIG. 7)

The fiber optic coil 42 (FIG. 6) is affixed to the outer surface of the substantially cylindrical wall 12 of the hub 10 (FIGS. 1-3) via the array of adhesive dots 50 (FIG. 7) at step 110. In exemplary embodiment, the fiber optic coil 42 (FIG. 6) is radially affixed to the outer surface of the substantially cylindrical wall 12 of the hub 10 (FIGS. 1-3) via the array of adhesive dots 50 (FIG. 7). In another exemplary embodiment, the fiber optic coil 42 (FIG. 6) is axially affixed to the flange 34 (FIG. 4) of the substantially cylindrical wall 12 (FIG. 4) of the hub 30 (FIG. 4) via the array of adhesive dots 50 (FIG. 7). In yet another exemplary embodiment, the fiber optic coil 42 (FIG. 6) is affixed to both the outer surface of the substantially cylindrical wall 12 of the hub 10 (FIGS. 1-3) via the array of adhesive dots 50 (FIG. 7).

What is claimed is:

1. A sensing loop for a fiber optic gyroscope, the sensing loop comprising:
    a substantially cylindrical hub having an outer surface;
    an array of pores formed on said outer surface of said substantially cylindrical hub;
    a fiber optic coil surrounding at least a portion of said substantially cylindrical hub, said fiber optic coil having a plastic coating thereon; and
    adhesive extruded through said array of pores onto said outer surface of said substantially cylindrical hub to form an array of adhesive dots affixing said plastic coating of said fiber optic coil to said substantially cylindrical hub.

2. A sensing loop according to claim 1, wherein said substantially cylindrical hub comprises at least one flange, and said array of adhesive dots axially affixes said fiber optic coil to said at least one flange.

3. A sensing loop according to claim 1, wherein said array of adhesive dots radially affixes said fiber optic coil to said substantially cylindrical hub.

4. A sensing loop according to claim 1, wherein said substantially cylindrical hub comprises at least one flange; and
    wherein said array of adhesive dots comprises:
        a first array of adhesive dots axially affixing said fiber optic coil to said at least one flange; and
        a second array of adhesive dots radially affixing said fiber optic coil to said substantially cylindrical hub.

5. A sensing loop according to claim 1, wherein said substantially cylindrical hub further comprises a conduit coupled to said array of pores and configured to transfer an adhesive therethough to said array of pores.

6. A sensing loop according to claim 1, wherein said substantially cylindrical hub has an axis; and
    wherein each pore of said array of pores radially extends away from said axis of said substantially cylindrical hub.

7. A sensing loop according to claim 1, wherein each adhesive dot of said array of adhesive dots has a bond surface cross sectional area from about 0.01 sq. in. to about 0.05 sq. in. and a free surface area from about 0.005 sq. in. to about 0.01 sq. in.

8. A sensing loop according to claim 2, wherein said substantially cylindrical hub has an axis, and wherein said at least one flange comprises an array of pores, each pore of said array of pores substantially equidistant from said axis of said substantially cylindrical hub.

9. A method for coupling a fiber optic coil having a plastic coating thereon to a hub of a fiber optic gyroscope (FOG), the method comprising the steps of:
    extruding adhesive through an array of pores formed on an outer surface of the hub;
    forming an array of adhesive dots on an outer surface of the hub from said extruded adhesive; and
    affixing the plastic coating of the fiber optic coil to the outer surface of the hub via the array of adhesive dots.

10. A method for coupling a fiber optic coil to a hub of a FOG according to claim 9, wherein said affixing step comprises:
    radially affixing the fiber optic coil to the outer surface of the hub via the array of adhesive dots.

11. A method for coupling a fiber optic coil to a hub of a FOG according to claim 9, wherein said affixing step comprises:
    axially affixing the fiber optic coil to a flange of the hub via the array of adhesive dots.

12. A method for coupling a fiber optic coil to a hub of a FOG according to claim 9, wherein said affixing step comprises:
    axially affixing the fiber optic coil to a flange of the hub via a first array of adhesive dots; and
    radially affixing the fiber optic coil to the outer surface of the hub via the array of adhesive dots.

13. An apparatus for supporting a fiber optic coil having a plastic coating thereon, the apparatus comprising:
    a substantially cylindrical wall having a first surface configured to couple with the fiber optic coil;
    a two-dimensional array of pores formed in said first surface of said substantially cylindrical wall; and adhesive extruded through said two-dimensional array of pores onto said first surface of said substantially cylindrical hub to form an array of adhesive dots affixing said plastic coating of said fiber optic coil to said substantially cylindrical hub.

14. An apparatus according to claim 13 further comprising:
a conduit extending axially through said substantially cylindrical wall and in fluid communication with one or more pores in said two-dimensional array of pores.

15. An apparatus according to claim 13, wherein said two-dimensional array of pores comprises:
a first distribution of pores along a first dimension; and
a second distribution of pores along a second dimension, said first distribution of pores substantially uniform with respect to said second distribution of pores.

16. An apparatus according to claim 13, wherein said two-dimensional array of pores comprises a geometric and uniform distribution on said first surface of said substantially cylindrical wall.

17. An apparatus according to claim 14, wherein said substantially cylindrical wall has a second surface; and
wherein said conduit couples said two-dimensional array of pores with said second surface of said substantially cylindrical wall.

18. An apparatus according to claim 17, wherein said substantially cylindrical wall has an axis; and
wherein said conduit comprises a plurality of channels coupling said second surface with said two-dimensional array of pores, each of said plurality of channels substantially parallel with said axis of said cylinder.

* * * * *